June 30, 1959
G. B. ALEXANDER ET AL
2,892,797
PROCESS FOR MODIFYING THE PROPERTIES OF A
SILICA SOL AND PRODUCT THEREOF
Filed Feb. 17, 1956
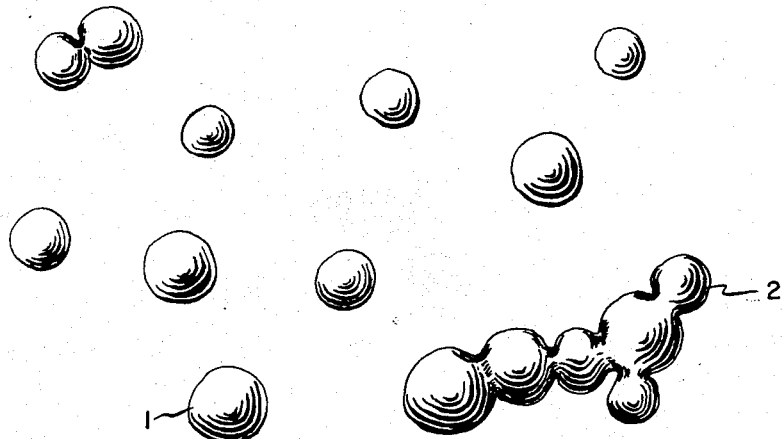
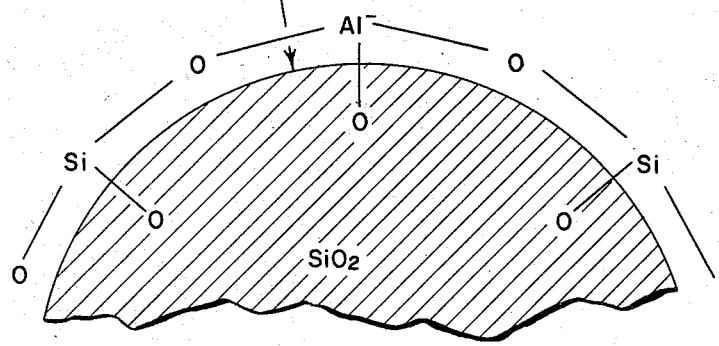
INVENTORS
GUY B. ALEXANDER
RALPH K. ILER
BY Albert B. Griggs
ATTORNEY

2,892,797
PROCESS FOR MODIFYING THE PROPERTIES OF A SILICA SOL AND PRODUCT THEREOF

Guy B. Alexander, Wilmington, and Ralph K. Iler, Brandywine Hundred, Del., assignors to E. I. du Pont de Nemours & Company, Wilmington, Del., a corporation of Delaware Application February 17, 1956, Serial No. 566,143

7 Claims. (Cl. 252—313)

This invention relates to silica sols modified by treatment with a very small amount of a solution of a metalate so that the silica particles are coated with no more than a molecular layer of a combined metal which forms an insoluble silicate at a pH between 5 and 12.

In the drawing:

Figure 1 illustrates the particles in a typical silica sol, and

Figure 2 is an enlarged diagrammatic view of the surface of a typical sol particle of the invention.

Silica sols which carry a metal upon the surface of the particles according to the invention are of increased stability. The sols are stable at lower pH than the sols from which they are prepared. They are also more stable at high pH because the metal hinders the depolymerization of the silica.

THE SILICA SOL

Any silica aquasol can be treated according to the present invention. In general it may be said of silica sols that they contain colloidal, amorphous silica particles which are in the size range from about 3 to the upper limits of colloidal size, say about 150 millimicrons. It is, however, preferred to use sols in which the particles average from about 5 to 50 millimicrons. It is difficult to measure accurately the particle size in sols having particles with an average size around 5 millimicrons. Specific surface area is more easily measured and can be used for determination of the approximate size of the particles in the sol. The method of determining surface area is described below. Sols having an average particle size of 5 millimicrons will have a specific surface area of about 600 m.²/g. and those 50 millimicrons of 60 m.²/g. If the particles in a sol have an average size of about 3 millimicrons this will correspond to a specific surface area of about 1000 m.²/g.

Sols suitable for use according to the invention can be prepared, for example, as shown in the Bird U.S. Patent 2,244,325 or the Voorhees Patent 2,457,971. Products as thus prepared will ordinarily contain particles having an average size ranging downwardly from about 8 to 10 millimicrons. The average particle size shortly after preparation of the sols will be about 3 millimicrons and this will increase as the sols are heated.

Suitable sols can also be made by the reaction of alkali metal silicates with acids, such as sulfuric, hydrochloric, sulfamic and the like, under conditions which produce sols according to prior art practices. Sols as thus prepared will, of course, contain salts which must be removed by conventional methods such as by the use of ion exchange resins or by dialysis.

A particularly preferred type of sols are those containing particles of somewhat larger diameter. Such sols can be produced by processes described in the Bechtold and Snyder Patent 2,574,902. Sols as thus prepared have a larger particle diameter because a starting sol is used as a heel and silica is built-up upon the particles by the addition of further quantities of active silica at an elevated temperature.

Sols as prepared by Bechtold and Snyder consist essentially of spheroidal particles such as shown in Figure 1 of the drawing, especially at 1. This representation is applicable in general to sols prepared by ion exchange, with or without build-up, if the sols have not been subjected to conditions which cause aggregation of the particles. There may be a small amount of aggregation, depending upon the specific process by which the sol is made.

Silica sols can also be prepared as shown in the White Patent 2,375,738 by making a silica gel, washing it, and then dispersing the gel to form a sol. Such sols contain aggregates of the ultimate particles as shown at 2 in Figure 1 of the drawing. These aggregates may reach comparatively large sizes and may, upon standing, form super-colloidal particles which separate from the sol. Aggregates are also apt to be present in silica sols prepared by any procedure in which a gel is redispersed.

While silica sols such as those produced in the Bechtold and Snyder patent above cited, can usually be employed without further modification, according to the invention it is preferred that the sols be comparatively free of excess sodium and also be free of soluble salts.

Sols to be treated can be slightly alkaline, with pH in the range 7 to 11, preferably 7 to 9. This corresponds to an $SiO_2:Na_2O$ weight ratio of about 300:1 for a sol in which the particles have a surface area of about 200 square meters per gram. Sols having lower surface area require proportionately less alkali. On the other hand, deionized sols, having a pH in the range 3 to 5, can be treated. Since silica sols gel most readily in the pH range of 5 to 7, this is not a preferred pH range, but can be used.

The removal of cations and anions can be effected by the use of cation and anion exchangers well known in the art. Exchangers can be used such as those described in Rule 2,577,485, Bechtold and Snyder 2,574,902 and Iler et al., 2,650,200. A mixture of cation and anion exchangers can be used in accordance with known practices when it is desired to remove both anions and cations.

Sols which have great purity and which can be used as starting materials are, for example, those described in Rule Patent 2,577,485. This patent shows the preparation of sols free from electrolytes with the addition of traces of alkali metals to effect restabilization.

Summarizing, it is noted that prior art sols generally can be employed. Various of the prior art sols are described in Bechtold and Snyder 2,574,902, Iler 2,668,149 and Iler 2,650,200. The most stable sols, especially in the alkaline range, are prepared from sols having discrete particles which are of relatively large particle size. These are of course above 5 millimicrons and it is preferred that they be above about 15 millimicrons.

There can also be used sols such as those shown in Trail 2,573,743 and Legal 2,724,701.

The sodium ion can be partly or entirely replaced with tetra-methylammonium hydroxide and other bases.

Sols of high stability such as those prepared as shown in the Rule patent above cited can be treated at relatively high silica concentrations up to, say, 40% or even higher.

THE TREATING METAL

According to the invention the silica sol is surface-reacted to form a coating in which the metal is combined with the surface of the silica particles in the sol.

The metals which can be used are those which are amphoteric and which form an insoluble silicate at a pH between 5 and 12. Aluminum, tin, zinc, and lead are preferred, aluminum being the most preferred of these.

The metals can be added to a sol in alkaline solution in the form of an alkali metalate such as sodium, potassium, tetra-methylammonium, or lithium, aluminate, stannate, zincate or plumbite. Sodium metalates are preferred. Stable, water soluble metalate salts like sodium aluminate and sodium stannate which can be readily dissolved to form relatively stable aqueous solutions in the absence of excess alkali are preferred treating agents.

It will be understood that ordinarily the metals should be added in the form of their alkaline aqueous solutions and the solutions can have any concentration. If the solutions are quite concentrated, the addition of the treating agent without causing a local, undesirably high concentration of the metal ion in the sol is made mechanically difficult. Of course very dilute solutions will effect some dilution of the sol.

The amount of the metal treating agent added to a sol must be carefully controlled. Enough of the metal should be used to effect a desired treatment. Too much should not be used or else the sol will then contain the metal compound as an impurity or it may even form a precipitate in the system.

It is believed that the metal coats and becomes chemically bound to the surface of the silica particles. When the metal is aluminum it substitutes for silicon in the silica lattice and, because of an increased negative charge on the surface of the particles, the sol becomes more stable. Similarly with the other metals the particles become more negative.

This is shown in Figure 2 in which aluminum is illustrated as the added metal. The trivalent aluminum has combined with the surface of the silica particle, replacing a tetravalent Si atom previously present in the lattice which forms the surface of the particle thus creating a site for a negative charge. The aluminum is shown in the drawing as having a negative charge (or dangling valence?) which causes the particle to become more negative. Whether or not this theory is correct, it is evident that the metal combines or coats the silica particles in such a fashion as to modify the surface characteristics of the particles.

The amount of the metal should be no more than that required to form a monomolecular layer on the particle. The amount should be substantial so that a notable result is obtained. This can be expressed empirically by saying that the amount of the metal should be such that:

(1) $$\frac{\text{Gram atoms } M}{\text{Gram atoms Si}} = \frac{A}{1{,}250} \text{ to } \frac{A}{250{,}000}$$

and preferably:

(2) $$\frac{\text{Gram atoms } M}{\text{Gram atoms Si}} = \frac{A}{3{,}000} \text{ to } \frac{A}{125{,}000}$$

where M is the metal and A is the surface area of the particles of the silica sol expressed in square meters per gram.

Within the ranges given above there are preferred regions depending upon the use to which the sol is to be put. Thus for use in compositions which are expected to be stable against gelation in neutral or slightly acidic solutions such as emulsion paints, the amounts of metal can be in the ranges shown above but the preferred practical range is:

(3) $$\frac{\text{Gram atoms } M}{\text{Gram atoms Si}} = \frac{A}{25{,}000} \text{ to } \frac{A}{62{,}500}$$

For sols which will readily exhaust on fabrics and for sols which can be dried to acid dispersible powders the ranges indicated in Formulas 1 and 2 above can be used but the preferred range for such uses is:

(4) $$\frac{\text{Gram atoms } M}{\text{Gram atoms Si}} = \frac{A}{4{,}000} \text{ to } \frac{A}{12{,}500}$$

The surface area of the particles of silica in a silica sol can be determined by transferring the particles to an organic liquid and then drying. Thereafter, the specific surface area can be determined by nitrogen absorption as described in an article "A New Method for Measuring the Surface Areas of Finely Divided Materials and for Determining the Size of Particles" by P. H. Emmett, in the publication "Symposium on New Methods for Particle Size Determination in the Sub-Sieve Range" published by the American Society for Testing Materials, March 4, 1941, page 95. The methods for the determination of specific surface area of the particles in a silica sol are discussed further in the Rule Patent 2,577,485 and in Iler 2,657,149. It is also to be noted that the methods of examining the average particle size and other characteristics of sols are also described in those patents.

THE MODE OF EFFECTING THE SURFACE REACTION

The silica aquasol and an aqueous solution of the metalate selected can be brought together at practically any concentration and under practically any conditions, provided only that the pH does not vary locally so as to go outside the ranges already given.

The metalate can be added directly to the sol with violent agitation which prevents a local concentration. The mixing can be done in any of the ways known in the art for effecting intimate and immediate admixture without local concentrations. Thus, the metalate solution can be added at a venturi located at the bottom of a body of silica sol or it can be added to a rapidly moving stream of the silica sol which then discharges into a large body. Again the sol and the metalate solution can be brought together in a centrifugal pump or in a tube under conditions of turbulent flow.

The temperature of the treatment will ordinarily be the ambient temperature. Higher temperatures can be used.

It is preferred that the metal be brought together with the silica sol in the substantial absence of salts. More specifically, free salts like sodium sulfate, sodium chloride and aluminum sulfate can be present in total amount no greater than:

$$M_c = \frac{0.5}{Z^6 c^{0.5}}$$

where $M_c$ is the molar concentration of salt present, Z is the valency of the salt cation, and c is the sol concentration expressed as percent $SiO_2$ by weight.

Preferably the salt content will not exceed:

$$M_c = \frac{0.02}{Z^6 c^{0.5}}$$

More preferred are those cases in which only traces of such salts are present, these sols being commonly called "salt-free."

The final product after it has been prepared can be adjusted as to pH in the range 5 to 12 by deionization or dialysis to remove excess ions or by adding acid such as hydrochloric or alkali such as sodium hydroxide.

THE PRODUCT

The products of the invention are silica sols the particles of which are coated with less than a molecular layer of a combined metal as described. The sols will vary depending upon the characteristics of the starting sol, but they will be stable at both lower and higher pH than the sols from which they were made. Sols having 25 percent coverage of the metal were obtained which were stable down to a pH of 3.7, although there was some aggregation of the particles at this pH giving the sol a somewhat turbid appearance. At a 50 percent coverage, stable sols were obtained by deionization from pH 12 to pH 8 though there was a slight precipitation at a pH lower than pH 4. This product gelled at pH 4.

Any ionic impurities in the finished sols can be removed as by the use of cation exchangers and anion exchangers.

The product pH, as has been noted above, can range from about 5 to 12. But especially interesting sols are those which are stabilized in the range from 5 to 7.

The specific character of the sols of the invention can readily be ascertained by examination. The amount of metal present can be determined by ordinary analytical techniques.

The size of the silica coated particles in the sols of the invention will be only slightly greater than the size of the particles in the starting sols. Thus the particles will range from, broadly, 3 to 150 millimicrons and, more specifically, from 5 to 50 millimicrons. The size and surface area of the silica particles can readily be determined by the means already discussed and the extent of coverage of the surface of the silica particles can then be readily calculated. The empirical relationship set out in the Formulas 1, 2, 3, and 4 in column 3 can be used as an empirical measure of whether or not the products are within the invention. For most purposes it will be sufficient to determine the surface area of the coated silica particles and then determine the amount of the metal and of the silica by analysis. This method will be approximate but will be adequate unless the particles are near one end of the range, in which case the methods previously mentioned should be used.

The sols can be used as are the silica sols from which they are made and additionally they have a wider range of utility. For example, when included in rubber compositions which will be subjected to alkaline conditions they produce a more stable product. The silica is subject to being leached from the rubber by alkali in the normal course of use while a coated silica particle as prepared according to the invention is more stable to alkali.

A changed surface of the silica particles in a sol is advantageous when it is desired to have the characteristic properties of the metals rather than those of silica. The sols, for example, can be used as starting materials for making catalysts of the gel type.

The sols prepared according to the invention can be used in wax compositions, for the treatment of textiles and pile fabrics, and for other such uses of the ordinary silica sols.

In certain cases, silica particles which are coated with a metal can be redispersed after drying. For example, a silica sol was treated with sodium aluminate in an amount to give $$\frac{\text{Gram atoms } M}{\text{Gram atoms Si}} = \frac{A}{1560}$$

This product was dried from acetone. The powder obtained was readily dispersible in dilute hydrochloric acid.

In order that the invention may be better understood the following specific illustrative examples are given in addition to those already generally indicated above:

*Example 1*

A 6.53 molar sodium aluminate solution containing 2.23 molar sodium hydroxide was prepared by dissolving sodium aluminate in distilled water.

A silica sol was used which contained 30% $SiO_2$ and in which the particles averaged 17 millimicrons in diameter. This sol is sold commercially as "Ludox" colloidal silica and was a sol of the character described in Bechtold and Snyder 2,574,902. The sol was deionized with a mixed anioncation exchange resin. The deionized solution was treated with one normal NaOH to adjust the $SiO_2:Na_2O$ ratio to 250:1 and diluted to 5% $SiO_2$ solids.

Four hundred grams of this silica sol was placed in a Waring Blendor and 6.48 milliliters of the sodium aluminate solution was added through a capillary tube which terminated at the mixer blades. The addition was continued over a period of about 25 minutes. The resulting sol had a pH of 11.7.

The specific surface area of the starting sol was 215 square meters per gram so that the expression above given of the ratio of gram atoms of the metal to those of silicon is as follows:

$$\frac{\text{Gram atoms Al}}{\text{Gram atoms Si}} = \frac{215}{1600}$$

*Example 2*

A silica sol the type shown in Example 1 containing 30% of $SiO_2$ in the form of 17 millimicrons amorphous silica particles was deionized to a pH of 3.0 with "Dowex 50," a cation exchange resin in the hydrogen form. Of course any cation exchange resin in the hydrogen form can be used.

To 600 milliliters of this solution, 15.9 milliliters of a freshly prepared 6.26 molar sodium aluminate solution was added with vigorous stirring. The aluminate solution was added through a capillary which terminated near the agitator blades. The solution was added over a period of 18 minutes. The pH of the resulting sol was 10.66.

The sol as prepared was stable for the duration of a test of 37 months. It appears that the sol will be stable indefinitely.

The starting sol has a specific surface area of 200 m.$^2$/g. The expression:

$$\frac{\text{Gram atoms Al}}{\text{Gram atoms Si}} = \frac{200}{7,200}$$

*Example 3*

A 5.5 molar sodium aluminate solution, 2 molar with respect to sodium hydroxide, was prepared by dissolving sodium aluminate (reagent grade) in distilled water.

A silica sol was used which contained 30% $SiO_2$ and in which the particles averaged 17 millimicrons in diameter. This sol is sold commercially as "Ludox" colloidal silica and was a sol of a character described in Bechtold and Snyder 2,574,902. The sol was an alkali stabilized one in which the $SiO_2:Na_2O$ ratio was approximately 90:1.

Four hundred grams of this silica sol was placed in a Waring Blendor and 9.72 milliliters of the sodium aluminate solution was added through a capillary tube which terminated at the mixer blades. The temperature of the mixture was maintained at 25° C. by means of a cooling coil, and a cation exchange resin in the hydrogen form ("Nalcite" HCR) was added to remove sodium hydroxide and maintain the pH of the mixture at 11. The addition of the aluminate required 5 minutes.

The specific surface area of this sol was 190 m.$^2$/g. so that the expression above given of the ratio of gram atoms of the metal to those of the silicon is as follows:

$$\frac{\text{Gram atoms Al}}{\text{Gram atoms Si}} = \frac{190}{7100}$$

By using different amounts of the sodium aluminate solution but otherwise maintaining other conditions of the example, sols can be prepared as above in which the expression $$\frac{\text{Gram atoms Al}}{\text{Gram atoms Si}} = \frac{190}{4,000}, \frac{190}{25,000}, \frac{190}{62,500}, \frac{190}{3,000}$$

and $$\frac{190}{125,000}$$

respectively.

*Example 4*

A sodium aluminate solution similar to that described in Example 1 was prepared.

A silica sol of the type used in Example 3 was deionized with a mixed anion-cation exchange resin to a pH of 3.1.

Four hundred grams of this silica sol were placed in a Waring Blendor and 9.72 milliliters of the sodium aluminate solution was added through a capillary tube which terminated at the mixer blades. The temperature of the mixture was maintained at 25° C. by means of a cooling coil and the time of addition was 6 minutes. The resulting sol had a pH of 10.9.

The specific surface area of the starting sol was 200 m.²/g. so that the expression is as follows:

$$\frac{\text{Gram atoms Al}}{\text{Gram atoms Si}} = \frac{200}{7,400}$$

*Example 5*

A sodium aluminate solution and a deionized silica sol of the type and strength used in Example 4 were prepared. These liquids were passed through a centrifugal pump such that the liquids were mixed in the highly turbulent zone of the rotor of the pump. The relative rates of flow of the liquids were 4.67 milliliters of the aluminate solution per 100 milliliters of the deionized "Ludox" at a flow of Ca. 50 milliliters "Ludox" per minute. The resulting sol had a pH of 10.9.

The specific surface area of the silica sol was 190 m.²/g. The expression:

$$\frac{\text{Gram atoms Al}}{\text{Gram atoms Si}} = \frac{190}{4,700}$$

This sol was readily concentrated to 50% silica without gelation.

*Example 6*

The coated sol prepared as in Example 5 was partially deionized with a cation exchange resin in the hydrogen form to a pH of 6.2. Using the same technique as described in Example 5, the sol was mixed with a sodium aluminate solution as described in Example 4, the relative flow rates through the centrifugal pump being 4.47 milliliters of the aluminate solution per 100 milliliters of the silica sol. The resulting sol had a pH of 10.8. The expression:

$$\frac{\text{Gram atoms Al}}{\text{Gram atoms Si}} = \frac{190}{2,400}$$

*Example 7*

A silica sol was used containing 30% of $SiO_2$ and having particles 17 millimicrons in diameter which correspond to a specific surface area of the silica particles of 200 m.²/g. Four hundred grams of this solution plus 200 grams of water was treated with "Nalcite HCR" in the hydrogen form and "Amberlite IR-4B" in the hydroxyl form. The resulting deionized sol had a pH of 3.1.

The sol was filtered to remove the resins and 100 milliliters of 1.0 normal stannate $Na_2SnO_3 \cdot 3H_2O$ was added over a period of 5 minutes with agitation. The addition was made through a tube terminating near the agitator blades as in the above examples. A sample amounting to 10 percent of the total volume of sol was taken after one-half of the sodium stannate had been added. This was a stable sol of the invention. The pH of this sol was 10.8. The ratio:

$$\frac{\text{Gram atoms Sn}}{\text{Gram atoms Si}} = \frac{200}{8,000}$$

After all of the stannate had been added the pH was 11.4 and the product was a thixotropic sol which sets to a weak gel. Upon agitation of the weak gel it reverts immediately to a fluid condition. A portion of this product was treated with an ion exchanger, "Nalcite HCR" resin, to remove sodium ions to a pH of 9.6. This sol was stable and did not show thixotropic properties. The ratio of:

$$\frac{\text{Gram atoms Sn}}{\text{Gram atoms Si}} \text{ was approximately } \frac{200}{4,000}$$

*Example 8*

The process of Example 7 can similarly be conducted using a silica sol having 40 millimicron particles containing 25 percent $SiO_2$. The specific surface area of the silica particles is 75 m.²/g. Forty percent as much of the sodium stannate solution is used as in Example 7.

The ratio:

$$\frac{\text{Gram atoms Sn}}{\text{Gram atoms Si}} = \frac{75}{6,260}$$

After addition of the stannate the sodium ion concentration is reduced by adding an ion exchanger, "Nalcite HCR" in the hydrogen form until the pH drops to 9.0.

*Example 9*

The process of Example 7 can similarly be carried out using a silica sol having 10 millimicron particles and containing 10 percent $SiO_2$. The amount of stannate is such that the ratio:

$$\frac{\text{Gram atoms Sn}}{\text{Gram atoms Si}} = \frac{300}{10,000}$$

*Example 10*

One hundred milliliters per minute of a silica sol containing 30% $SiO_2$ as particles 17 millimicrons in diameter, and having a weight ratio of $SiO_2:Na_2O$ of 287, was passed through a centrifugal pump. Simultaneously and at the rate of 0.925 milliliter per minute, a second solution consisting of 2.4 grams of technical grade sodium aluminate in 36 milliliters of water was passed through the same pump in the manner described in Example 5. The resulting sol had a pH of 8.5.

The specific surface area of the silica sol was 215 m.²/g. The ratio:

$$\frac{\text{Gram atoms Al}}{\text{Gram atoms Si}} = \frac{215}{231,000}$$

To compare the stability of this sol at low pH with the silica sol used in the example but without treatment, a sample of each was treated with a cation-exchanger resin in the hydrogen form to reduce the pH to about 6. After ageing for four days the viscosity of the untreated silica sol increased from 3.45 to 4.30 cps. The sol of the example remained virtually unchanged throughout this period.

*Example 11*

A silica sol was used containing 10% $SiO_2$ and having particles of 16 to 17 millimicrons in diameter corresponding to a specific surface area of the particles of 210 m.²/g. This sol was treated with a mixture of cation and anion exchange resins to give a deionized sol of pH 2.9. The cation exchange resin was in the hydrogen form and was "Dowex 50," a nuclear sulfonated polymer of styrene containing eight percent of divinyl benzene. This product is described in JACS, vol. 69, page 2830, November 1947. The anion exchange resin was in the hydroxyl form and was "Amberlite IR 4B," a modified phenolformaldehyde polyamine condensate containing 14 percent of nitrogen and 39.9 percent of water in the basic form of the resin and having an exchange capacity of about 10 milli-equivalents per gram of resin. The product is described in JACS vol. 69, page 2874, November 1947. The spent resin was removed by filtration.

A solution of sodium zincate was prepared by dissolving 17.7 grams of zinc oxide and 34.7 grams of sodium hydroxide in 47.6 grams of water. This solution was 3.65 molar with respect to zinc.

To 200 grams of the silica sol in a Waring Blendor was added over a period of 4 to 5 minutes, a mixture of 2.19 milliliters of the zincate solution and 198 milliliters of water. The resulting sol had a pH of 11.9.

The sodium ion concentration of this sol was reduced by passing it through a column of cation exchange resin in the hydrogen form. The resin was "Amberlite IRC 50," a polycarboxylic acid type resin prepared by polymerizing methacrylic acid with about ten percent of its weight of divinyl benzene using a peroxide catalyst. The pH of the effluent sol was 9.6. The ratio:

$$\frac{\text{Gram atoms Zn}}{\text{Gram atoms Si}} = \frac{210}{8,400}$$

*Example 12*

A silica sol containing 20% $SiO_2$ having particles of 17 millimicrons diameter corresponding to a specific surface area of about 200 m.²/g. is deionized as described in Example 11. The filtered sol has a pH of 3.0.

A solution of sodium plumbite is prepared by dissolving 1.19 grams of lead monoxide in 100 milliliters of 1 N sodium hydroxide.

The solution of sodium plumbite is then added to 100 grams of the silica sol contained in a Waring Blendor by injection of the former near the impeller of the Blendor, the addition requiring a period of 5 minutes. The resulting sol has a pH of over 13, and is highly thixotropic. It is immediately treated with "Amberlite IRC 50" cation exchange resin under conditions of vigorous agitation until the pH is reduced to 10.1. The resulting sol is stable and has a ratio:

$$\frac{\text{Gram atoms Pb}}{\text{Gram atoms Si}} = \frac{200}{12,000}$$

*Example 13*

A silica sol was prepared as follows: 704 grams of sodium silicate having a 3.25:1 $SiO_2$:$Na_2O$ weight ratio and containing 28.4% $SiO_2$ was diluted with distilled water to 5.5 liters. This was decationized by passage through a column of "Dowex 50" cation exchange resin in the hydrogen form and alkalized with 26.3 grams of sodium silicate as above described which had been diluted with distilled water to 210 milliliters. This sol contained 3.6% $SiO_2$ and had a weight ratio of $SiO_2$:$Na_2O$ of 90:1. The sol particles were grown to about 4 millimicrons diameter by heating the sol to 55° C. and immediately quenching.

A 5.2 molar sodium aluminate solution was prepared by dissolving C.P. sodium aluminate in distilled water. The silica sol prepared as above was completely deionized by passage through a mixed bed of a cation exchange resin in the hydrogen form "Dowex 50," and an anion exchange resin in the hydroxyl form, "Amberlite IR 4B." The sol and the aluminate solutions were then mixed at the impeller of a centrifugal pump as in Example 5. The relative rate of flow of the liquids was 1.22 milliliters of aluminate per 100 milliliters of deionized sol. The resulting sol had a pH of 10.1.

The specific area of the silica sol prior to treatment with aluminate was 820 m.²/g. The relation of aluminum to silicon in the mixture was:

$$\frac{\text{Gram atoms Al}}{\text{Gram atoms Si}} = \frac{820}{8,000}$$

This sol was deionized to a pH of 7.2 and concentrated by vacuum evaporation to 8% $SiO_2$. No change in sol viscosity was noted over a 3 month period. During this period the specific surface of the silica dropped only to 780 m.²/g.

This application is a continuation-in-part of our application Serial No. 449,308, filed August 12, 1954, now abandoned.

We claim:

1. In a process for modifying the properties of a silica sol, the step comprising treating a silica aquasol in which the silica particles have an average size from 3 to 150 millimicrons by adding to it an aqueous solution of a water-soluble metalate of an amphoteric metal which forms an insoluble silicate at a pH between 5 and 12, the amount of the metal being such that:

$$\frac{\text{Gram atoms } M}{\text{Gram atoms Si}} = \frac{A}{1,250} \text{ to } \frac{A}{250,000}$$

where M is the metal and A is the specific surface area of the particles of the silica sol expressed in square meters per gram.

2. In a process for modifying the properties of a silica sol, the step comprising treating a silica aquasol in which the silica particles have an average size from 3 to 150 millimicrons by adding to it an aqueous solution of a water-soluble metalate of an amphoteric metal selected from the group consisting of aluminum, tin, zinc, and lead, the amount of metal being such that:

$$\frac{\text{Gram atoms } M}{\text{Gram atoms Si}} = \frac{A}{3,000} \text{ to } \frac{A}{12,500}$$

where M is the metal and A is the specific surface area of the particles of the silica sol expressed in square meters per gram.

3. In a process for modifying the properties of a silica sol, the steps comprising treating a silica aquasol in which the silica particles have an average particle size of from 5 to 50 millimicrons and in which the salt content is less than one-tenth the normality which would result from neutralization of sodium silicate to produce the amount of silica present in the sol, by adding to such sol an aqueous solution of a metalate of an amphoteric metal which forms an insoluble silicate at a pH between 5 and 12, adjusting the pH of the mixture to 5 to 12, the amount of the metal being such that:

$$\frac{\text{Gram atoms } M}{\text{Gram atoms Si}} = \frac{A}{1,250} \text{ to } \frac{A}{250,000}$$

where M is the metal and A is the specific surface area of the particles of the silica sol expressed in square meters per gram.

4. In a process for modifying the properties of a silica sol, the steps comprising treating a sol in which the silica particles have an average particle size of from 5 to 50 millimicrons and in which the salt content is less than one-tenth the normality which would result from neutralization of sodium silicate to produce the amount of silica present in the sol, by adding to such sol an aqueous solution of a metalate of a metal selected from the group consisting of aluminum, tin, zinc, and lead, adjusting the pH of the mixture to 5 to 12, the amount of the metal being such that:

$$\frac{\text{Gram atoms } M}{\text{Gram atoms Si}} = \frac{A}{3,000} \text{ to } \frac{A}{125,000}$$

where M is the metal and A is the specific surface area of the particles of the silica sol expressed in square meters per gram.

5. A modified silica sol in which the silica particles have an average size of 3 to 150 millimicrons and in which the silica particles are coated with chemically combined atoms of an amphoteric metal which forms an insoluble silicate at a pH between 5 and 12, said metal atoms being chemically bonded, through oxygen atoms, to silicon atoms in the surface of said particles, and the amount of metal being such that:

$$\frac{\text{Gram atoms } M}{\text{Gram atoms Si}} = \frac{A}{1,250} \text{ to } \frac{A}{250,000}$$

where M is the metal and A is the surface area of the particles of the silica sol expressed in square meters per gram.

6. A modified silica sol in which the silica particles have an average size above 3 to 150 millimicrons and in which the silica particles are coated with chemically combined atoms of a metal selected from the group consisting of aluminum, tin, zinc, and lead, said metal atoms being chemically bonded, through oxygen atoms, to silicon atoms in the surface of said particles, and the amount of metals being such that:

$$\frac{\text{Gram atoms } M}{\text{Gram atoms Si}} = \frac{A}{3,000} \text{ to } \frac{A}{125,000}$$

where M is the metal and A is the surface area of the particles of the silica sol expressed in square meters per gram.

7. A modified silica sol in which the silica particles have an average size from 5 to 50 millimicrons and in which the silica particles are coated with chemically combined atoms of aluminum, said aluminum atoms being chemically bonded, through oxygen atoms, to silicon atoms in the surface of said particles, and the amount of aluminum being such that:

$$\frac{\text{Gram atoms } M}{\text{Grand atoms Si}} = \frac{A}{1,250} \text{ to } \frac{A}{250,000}$$

where M is the metal and A is the specific surface area of the particles of the silica sol expressed in square meters per gram.

References Cited in the file of this patent
UNITED STATES PATENTS

| | | |
|---|---|---|
| 2,280,649 | Kanhofer | Apr. 21, 1942 |
| 2,285,314 | Thomas et al. | June 2, 1942 |
| 2,287,917 | Thomas et al. | June 30, 1942 |
| 2,289,919 | Lee et al. | July 14, 1942 |
| 2,657,183 | Bechtold | Oct. 27, 1953 |
| 2,663,650 | Iler | Dec. 22, 1953 |